UNITED STATES PATENT OFFICE.

CARL AUGUST KAPFERER AND JAKOB WEBER, OF ELBART, GERMANY, ASSIGNORS TO CARL AUGUST KAPFERER, OF ELBART, GERMANY.

METHOD OF IMPROVING THE PERMEABILITY TO AIR OF DRY PLASTERING-MORTAR.

1,180,775.  Specification of Letters Patent.  Patented Apr. 25, 1916.

No Drawing.   Application filed August 15, 1911.  Serial No. 644,165.

*To all whom it may concern:*

Be it known that we, CARL AUGUST KAPFERER and JAKOB WEBER, subjects of the German Emperor, and residing at Elbart, Kingdom of Bavaria, Germany, have invented certain new and useful Improvements in Methods of Improving the Permeability to Air of Dry Plastering-Mortar, of which the following is a specification.

Whereas hitherto plastering mortar was prepared by wet process on the job and therefore besides slaked lime only such materials could be employed which could be easily obtained, dry plastering mortars have in recent years found an ever increasing introduction. These dry plastering mortars are supplied to the job ready mixed and require only an addition of water for being ready for use. They are manufactured on a wholesale scale so that a far greater number of materials may be employed therefore than with the old fashioned method. It will therefore also be possible to give the mortar at once all desirable properties. The new plastering mortars were employed above all where the plastering was not to be subsequently coated with paint. Very fine architectural effects were obtained by staining the mortar, by adding granular rocks and minerals to the slaked lime. It was also found possible to render the mortar storable and to prevent a premature setting or caking during storage or transport and on the access of moisture, even if setting mortar formers or binding substances were present. The dry plastering mortars, however, still showed the disadvantages, that they would be discolored in time and that the plastering had a very close character in consequence of the necessity of employing mixtures of given grades of pulviform, granular and broken materials. The present invention obviates this disadvantage and produces above all a plastering material which is permeable to air and therefore of a high hygienic value. This is based on the fact that fats or oils are added to the finished mortar or one of the mortar components. The inventors have found that the permeability to air is thereby doubled. By reason of the addition of oil or fat, the dry mortar will not so readily absorb moisture, and consequently such mortar can be transported and stored with less danger of deterioration than the dry mortars heretofore used. The plastering material having such admixtures is furthermore water repellent and will keep its color, as soot, dust and other foreign substances will not adhere to it. Any soluble salts present or hydrates of lime which have been dissolved will be prevented from penetrating to the surface. The oiled or fatted mortars are more elastic under use, and may therefore be composed of a poorer quality, that is of a lower percentage of lime. Last of all they are less liable to dry rapidly, so that even in direct sunshine fissures or brittle spots will hardly occur.

In carrying out the new method of preparing plastering mortar permeable to air oil or fatty substances are added in a very small quantity to either the mortar former, white lime, magnesia-lime, hydraulic lime or to the admixtures granulated rock, minerals, sand. Instead of admixing them directly, they may also be embodied in an emulsion of fatty admixture after a suitable previous treatment. The admixtures are added to the lime during the slaking or afterward.

In preparing dry plastering mortar it will be found of advantage, to use slaked lime in form of a thick paste, after it has rested and lost its caustic properties. The sumped lime is then dried and the fatty substances may be added either immediately after slaking or after drying and before grinding, or also after the mortar has been made after drying and grinding.

Difficulties will be encountered in distributing the admixtures in a uniform manner, particularly if the lime paste is of a lardy character. For facilitating such distribution the oil or fat is dissolved or suspended in organic solvents (alcohol or acetone) and starch is simultaneously added. The starch or other highly molecular organic substances which are added in form of a fine powder will increase the elasticity of the mortar without any need of increasing the quantity of water. On the other hand the starch will also render the finished mortar proof against water. It is just as well to add oil or fat in solutions to dried, sumped slaked lime. In this case the alcohol or acetone solutions are sprayed over the still warm, dried lime, the solvent will be evaporated and the lime may be conveniently ground, without its smearing.

Another novel method of obviating the difficulty of obtaining a uniform mixture on the addition of oil or fat to the lime, and of injuriously affecting the setting capacity of the mortar consists in employing an emulsion of the fatty admixtures. To do this the inventors employ the following method: they stir lime water or thin lime milk in a vessel well with linseed oil, rape oil or some other suitable fat or oil. The formation of this emulsion may be facilitated by heating. An addition of gum will also be an improvement, in that it facilitates the distribution of oil in the solution. If the mixing is done sufficiently thoroughly a homogeneous fatty emulsion will be obtained which is employed for slaking the lime. Lime thus slaked, either in form of a paste or dried, will contain the admixture of oil in a uniformly distributed manner. The same will be the case with building or plastering mortar prepared with such lime. The emulsion may also be found by using alkali, hydrate of baryta or soaps soluble in water instead of with lime.

If the plastering mortars prepared with such emulsions are subject to the penetration of water there exist the danger that the emulsioned components are washed out. On the other hand the oily and fatty substances will, if directly added to one of the mortar admixtures, impair the hardening process, as they will insulate the particles of the mortar former or binder and the material or materials used therewith. Therefore the inventors when adding oil to these admixtures for plastering mortar employ oxidizable oils or fats in the following manner: One part of fine materials say sand and stone meal or also coloring earths or materials used at the same time are carefully mixed with the water repelling substance without any water being added and the mixture is then spread in the open air in a thin layer. The oil, say linseed oil, can quickly oxidize and be resinified. The slightly hardened mass is subsequently ground to a fine powder and then the other components of the mortar, lime or cement and certain coarser admixtures are added and all then mixed with water to a plastic paste.

Without any disadvantage the oils or fats may be added to the thinning materials, if these consist of porous, partly crumbling, weathered minerals, such as tailings from kaolin washing, debris of feldspar rock and the like. Such partly decomposed rock debris, which generally also contain quartz, are excellently suited, for preparing rough cast plastering mortars, and the oil will here afford beside the increased permeability to air the great advantage, that a further decomposition of the grains of mineral in the finished plaster under the influence of the weather is avoided. Without the admixture of oil the already crumbling rock debris will suffer by the inclemency of the weather, frost and heat and the plastered surfaces will begin to crumble off.

I claim:

1. A process for increasing the permeability to air of a dry coating mortar of lime, combined with granular, stony or finely powdered materials, which consists in slaking the lime by a dilute emulsion of fat, and then adding the other components of the mortar.

2. A process for increasing the permeability to air of a dry coating mortar of lime, combined with granular stony or finely powdered materials, by slaking the lime in a dilute emulsion formed by fat, combined with a feebly alkaline liquid, and then adding the other components of the mortar.

3. A process for increasing the permeability to air of a dry coating mortar of lime, combined with granular, stony or finely powdered materials by slaking the lime in a dilute emulsion formed of fat and lime water and then adding the other component parts of the mortar.

4. A process for increasing the permeability to air of a dry coating mortar, consisting of lime, combined with granular, stony or finely powdered materials, by slaking the lime in a dilute emulsion of oil converted into an emulsion with a slightly alkaline liquid and then adding the other component parts of the mortar.

In testimony whereof we hereto affix our signatures in the presence of two witnesses.

CARL AUGUST KAPFERER.
JAKOB WEBER.

Witnesses:
HEINRICH FIETH,
GEORGE HÖLLFRITSCH.